(12) United States Patent
Hamzy et al.

(10) Patent No.: US 7,568,143 B2
(45) Date of Patent: *Jul. 28, 2009

(54) SYSTEM AND METHOD OF UTILIZING A NETWORK TO CORRECT FLAWED MEDIA DATA

(75) Inventors: Mark J. Hamzy, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 11/334,700

(22) Filed: Jan. 18, 2006

(65) Prior Publication Data
US 2007/0208989 A1    Sep. 6, 2007

(51) Int. Cl.
*G06F 11/30* (2006.01)
(52) U.S. Cl. .................. 714/746; 714/747; 714/736; 714/770
(58) Field of Classification Search .................. 714/746, 714/747, 736, 763, 770, 773
See application file for complete search history.

(56) References Cited
U.S. PATENT DOCUMENTS 4,949,036 A * 8/1990 Bezinque et al. ............ 324/212
5,410,551 A * 4/1995 Edwards et al. ............. 714/736
6,295,571 B1 * 9/2001 Scardamalia et al. ........ 710/308
7,000,037 B2 * 2/2006 Rabinovitz et al. ............ 710/71
2004/0136534 A1 * 7/2004 Stiscia et al. ................. 380/256

OTHER PUBLICATIONS

Ryal et al., Hard Disk Drive Enabled DVD Player for Video on Demand, Sony Corporation IPD Case #50S5089, Mar. 1, 2004.

* cited by examiner

*Primary Examiner*—Esaw T Abraham
*Assistant Examiner*—Fritz Alphonse
(74) *Attorney, Agent, or Firm*—Dillon & Yudell LLP

(57) ABSTRACT

A system and method of utilizing a network to correct flawed media data. The media device includes a processor, a memory, a network adapter, a removable media interface, an error-correction module, and a communication module. The network device enables the media device to connect to the network and server. The removable media interface enables a user to couple a removable medium to the media device. After a user inserts a removable medium into the removable media interface, the processor and error-correction module examines the removable medium for physical errors. If the number of detected errors exceeds a predetermined threshold, the media device, via the network adapter and the communication module, queries a server for correction data. This correction data may be utilized by the media device to enable successful processing of the data stored on the removable medium.

1 Claim, 3 Drawing Sheets

SYSTEM AND METHOD OF UTILIZING A NETWORK TO CORRECT FLAWED MEDIA DATA

BACKGROUND OF THE INVENTION

1. Technical Field

The present invention relates in general to the field of networked data processing systems. More particularly, the present invention relates to a system and method of utilizing a network to correct flawed media data.

2. Description of the Related Art

Personal media players have increased in popularity in the last decade. One of the first personal media players was a video cassette recorder (VCR). However, the advent of the digital video disc (DVD) and personal video recorder (PVR) has increased the quality of media playback and reduced the costs associated with personal media players.

A rapidly growing segment of the personal media business is mail-order DVD rentals via services such as Netflix™. These services typically allow a user to indicate a collection of titles that he or she wishes to view. The service provider parses the list and periodically sends out selected DVD titles through the mail to the user. When the user has finished viewing the DVD, the user places the DVD back in the mail to be returned to the service provider.

DVDs eventually develop physical flaws due to multiple users mishandling the discs. Typically, the mail-order DVD rental services allow the recipient of a flawed DVD to indicate online or on the return envelope that the DVD contains flaws. Once the flawed disc is received by the service provider, a new disc is automatically sent to the user.

There are several disadvantages of the current mail-order DVD rental business model. Because the DVD must be returned to the service provider, the user must wait for the new DVD to arrive before he or she can view the movie. The small costs associated with returning flawed DVDs eventually become prohibitive as the DVDs are handled by more users. For example, some DVDs with minor flaws will be consistently returned (adding to mail costs) until they are removed from distribution. The error correction capabilities of different models of DVD players vary widely. Thus, DVDs with slight flaws might be successfully processed by some models but not others, which results in increased mail costs for returned discs. These returned discs might be unnecessarily replaced because they might be playable on some players but not others due to the vast range of error correction capacities of various DVD players.

Therefore, there is a need for a system and method for correcting flawed removable media without requiring a service provider to send a physical DVD via mail.

SUMMARY OF THE INVENTION

The present invention comprises a media device, a server, and a network such as the Internet. The media device includes a processor, a memory, a network adapter, a removable media interface, an error-correction module, and a communication module. The network device enables the media device to connect to the network and server. The removable media interface enables a user to couple a removable medium to the media device. After a user inserts a removable medium into the removable media interface, the processor and error-correction module examines the removable medium for physical errors. If the number of detected errors exceeds a predetermined threshold, the media device, via the network adapter and the communication module, queries a server for correction data. This correction data may be utilized by the media device to enable successful processing of the data stored on the removable medium.

The above-mentioned features, as well as additional objectives, features, and advantages or the present invention will become apparent in the following detailed written description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
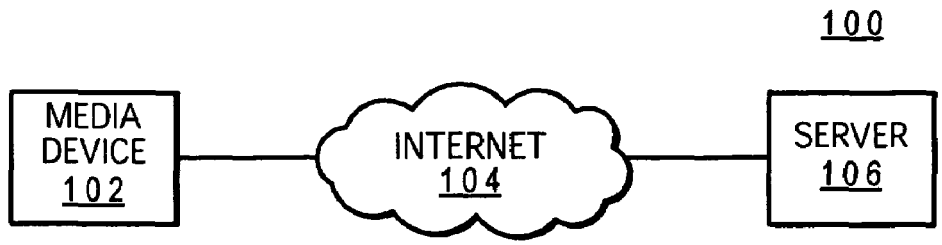
FIG. 1 is a block diagram illustrating an exemplary network in which a preferred embodiment of the present invention may be implemented.

Referring now to the figures, and in particular, FIG. 1, there is illustrated a block diagram depicting an exemplary network 100 in which a preferred embodiment of the present invention may be implemented. As illustrated, network 100 includes media device 102, which is discussed herein in more detail in conjunction with FIG. 2. Media device 102 utilizes a network adapter 208 and a communication module 204, as illustrated in FIG. 2, to connect to server 106 via Internet 104.

Figure 2:
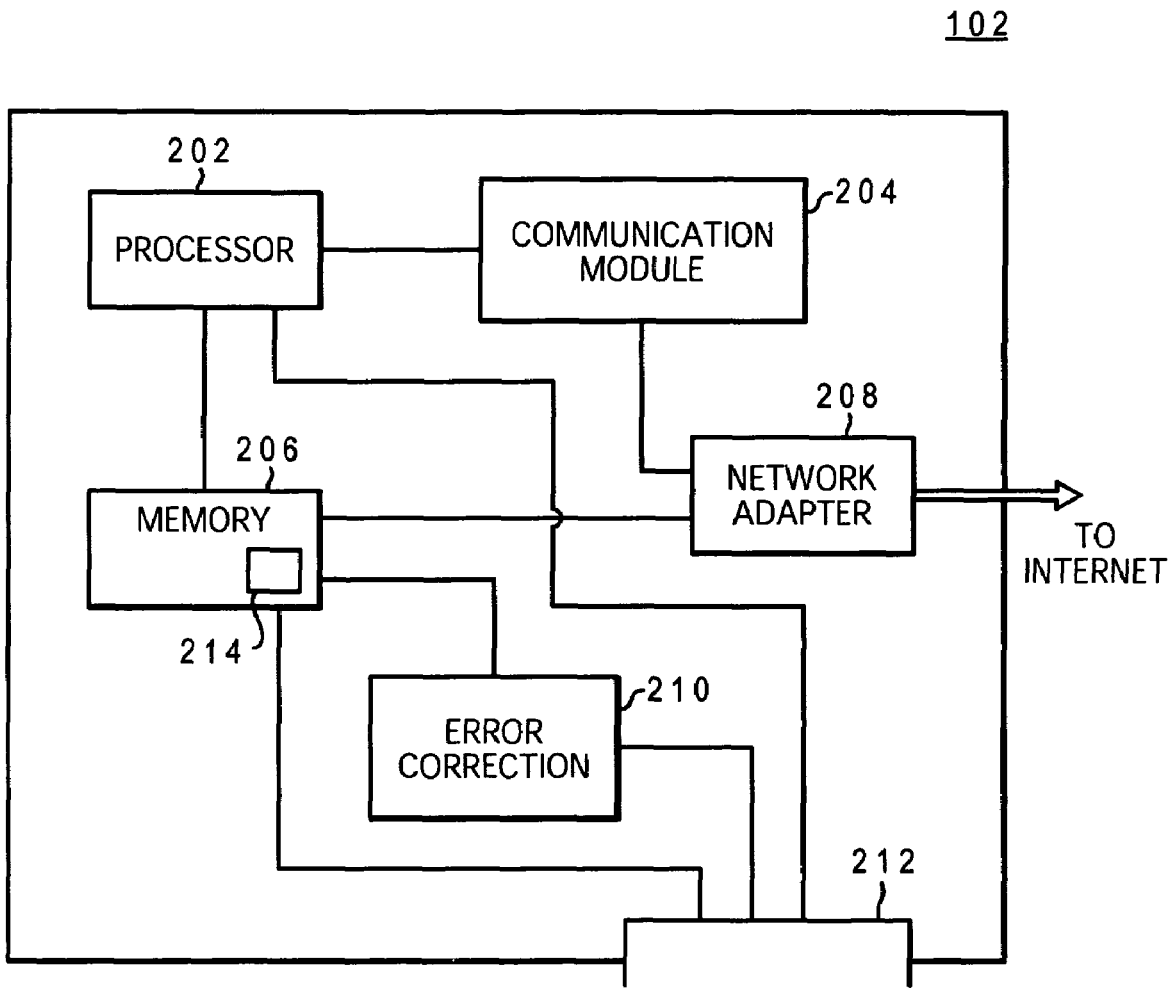
FIG. 2 is a block diagram depicting an exemplary media device in which a preferred embodiment of the present invention may be implemented.

With reference to FIG. 2, there is depicted a more detailed block diagram illustrating an exemplary media device 102 in which a preferred embodiment of the present invention may be implemented. As illustrated, media device 102 includes a processor 202, communication module 204, memory 206, network adapter 208, error correction module 210, and removable media interface 212. Media device 102 can be implemented as any type of media player and/or recorder, including but not limited to, a DVD, CD, or flash memory player.

During operation, the user places a removable medium (e.g., DVD, CD, flash memory, etc.) into removable media interface 212. Processor 202 begins processing the data stored on the removable medium. Error correction module 210 examines the removable medium for errors. If the number or severity of errors on the removable medium exceed a predetermined threshold, processor 202, in conjunction with communication module 204 and network adapter 208 query a server 106 (FIGS. 1 and 3) for correction data to enable successful processing of the data stored on the removable medium. Server 106 tailors the correction data to be sent to media device 102 depending on a variety of factors. For example, if server 106 determines that the connection established with media device 102 is a low-speed (e.g., dial-up) connection, checksum data for correcting damaged bits might be sent as opposed to replacement data for the damaged areas of the removable medium. Replacement data (e.g., entire chapters on a DVD) might be sent if server 106 and media device 102 have established a high-speed (e.g., broadband) connection. The correction data is stored in memory 206. In a preferred embodiment of the present invention, a user may set a collection of user preferences 214 that determine the type of correction data requested by media device 102. For example, even if the user has access to a high-speed connection, he or she may decide that the time required to receive the replacement data, as opposed to checksum data, is prohibitive. The user can request that media device 102 only request checksum data in the event of detecting a damaged removable medium.

If processor 202 has received checksum data as correction data from server 106, the correction data is streamed with the data stored on the removable medium during processing by processor 202 for on-the-fly corrections. However, if processor 202 has received replacement data as correction data, the correction data is merged with the original data stored on the removable medium. Therefore, during processing, when processor 202 reaches a flawed area of removable medium where undamaged data cannot be retrieved, processor 202 accesses the merged data stored in memory 206.

Those with skill in this art will appreciate that a preferred embodiment of the present invention may utilize any method of error correction to stream or merge the retrieved correction data with the data stored on the removable medium. An examples of an error correction algorithm well-known in the art is the Error Correction Code (ECC) algorithm which enables damaged bits within data to be repaired with checksum information. When data correction is needed, the missing or incomplete data needed to correct the physical flaws on the removable medium are generated in a list. Media device 102 contacts server 106 (which may be a computer system operated by the removable medium supplier) to retrieve the needed correction data.

Server 106 may also tailor the correction data sent to media device 102 depending on a variety of factors including, but not limited to: the connection speed established between server 106 and media device 102, the number and severity of errors found on the removable medium, etc. For example, if server 106 has determined that the connection established with media device 102 is a low-speed connection such as dial-up access, server 106 may opt to send only checksum or error correction data to correct damaged bits on the removable medium.

As previously discussed, a user may set a collection of user preferences 214 that determine the type of correction data requested by media device 102. This collection of user preferences 214 may be set by the user by accessing his or her respective user account on server 106 via the internet or locally set the collection of user preferences 214 via an interface located on media device 102. Server 106 may parse this collection of user preferences 214 and send the correction data in the user-requested form (e.g., checksum or replacement data). Server 106 may also send information to media device 106 indicating to the user a projected time required to correct the damaged data. Media device 106 can query the user, inquiring whether the projected time required to correct the damaged data is acceptable. If not, the user may request via media device 106 a new removable medium to be sent. Another option the user may select is the extent of the correction depending on the amount of time the user is willing to wait. For example, if the user wants high-quality correction (e.g., complete replacement of damaged data) and is willing to wait the required time, the user can select a "high-quality correction" option. If the user wants to forgo a high-quality correction because he or she would rather view the movie sooner, the user can select the "low-quality correction" option, which usually involves a request of checksum data for "on-the-fly" corrections.

Figure 4:
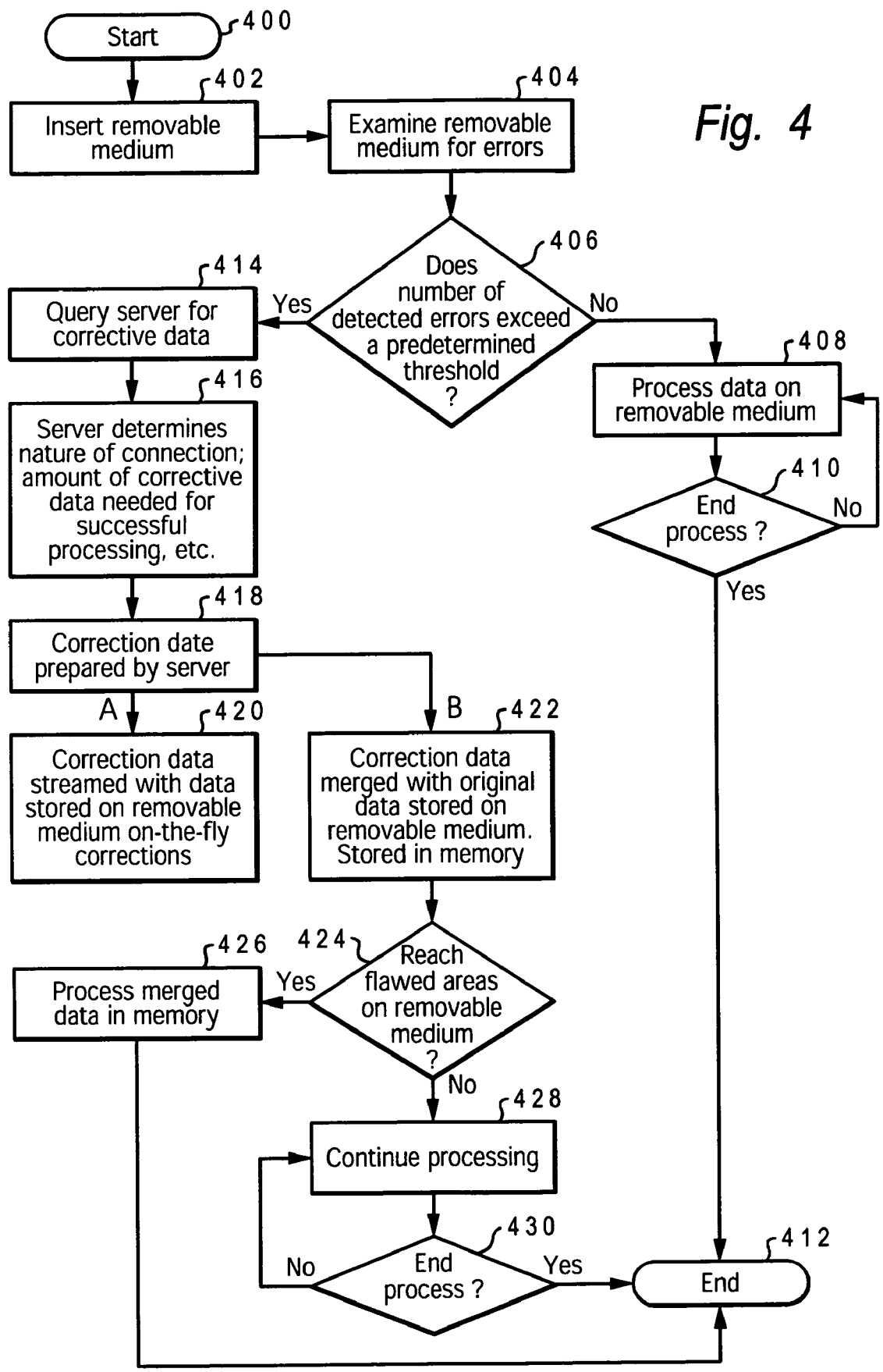
FIG. 4 is a high-level logical flowchart depicting a method of utilizing a network to correct flawed media data according to a preferred embodiment of the present invention.

As discussed herein in more detail in conjunction with FIG. 4, checksum or error correction data can be combined with data stored on the removable medium for on-the-fly data corrections during processing. However, there are times, especially when there are a large number of detected errors on the removable medium and the connection established with media device 102 is a high-speed (e.g., broadband) connection, server 106 may opt to send data that replaces the parts of the data stored on the removable medium that is damaged by physical defects. This data would be stored in memory 206 of media device 102. During processing of the data stored in the removable medium, processor 202 may encounter areas on the removable medium that are damaged due to physical defects. Instead of correcting the data stored in the damaged areas via checksum and correction data, processor 202 processes the downloaded replacement data from memory 206. This reduces the processing requirements on processor 202, as compared to a real-time, on-the-fly correction of damaged data.

Figure 3:
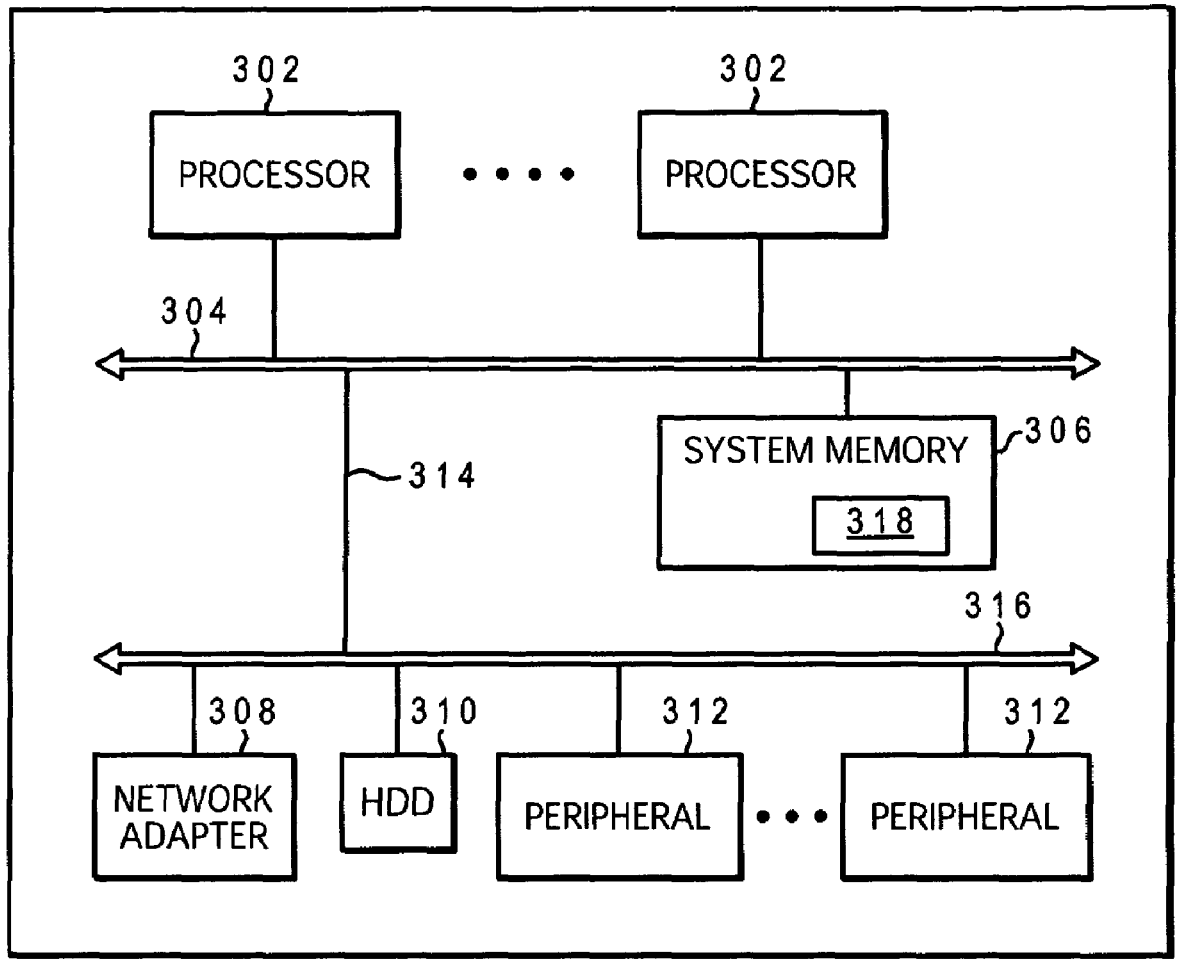
FIG. 3 is a block diagram illustrating an exemplary server in which a preferred embodiment of the present invention may be implemented.

FIG. 3 is a block diagram illustrating an exemplary server 106 in which a preferred embodiment of the present invention may be implemented. As illustrated, server 106 includes at least one processor 302, which is coupled to system memory 306 via system interconnect 304. System memory 306 also includes a correction data module 318, which determines the character of the correction data to be sent to fulfill a correction data request from a media device 102. For example, correction data module 318 may determine that checksum data utilized for on-the-fly correction of damaged bits may be more appropriate for a particular correction data request. In other situations, correction data module 318 may determine that replacement data (e.g., entire chapters on a DVD) might be more feasible as correction data. Correction data module 318 considers a variety of factors, such as: speed of connection between media device 102 and server 106, severity of damage to the particular removable medium, etc.

Mezzanine interconnect 314 couples system interconnect 304 to peripheral interconnect 316. Those with skill in this art will appreciate that peripheral interconnect 316 may be implemented as any type of peripheral interconnect including, but not limited to, peripheral component interconnect (PCI), accelerated graphics port (AGP) and small computer system interface (SCSI) buses. Coupled to peripheral interconnect 316 is a network adapter 308, hard disk drive (HDD) 310, and a collection of peripherals 312. Network adapter 308 couples server 106 to Internet 104 and allows server 106 to fulfill correction data requests from media device 102, as discussed herein in more detail in conjunction with FIG. 4. System memory 306 and hard disk drive (HDD) 310 store a collection of correction data that may be tailored to each unique correction data request.

FIG. 4 is a high-level logical flowchart diagram illustrating an exemplary method of utilizing a network to correct flawed media data according to a preferred embodiment of the present invention. The process begins at step 400 and proceeds to step 402, which illustrates a user inserting a removable medium into removable media interface 212 of media device 102. The process proceeds to step 404, which depicts processor 202 and error correction module 210 examining the removable medium for physical errors. As previously discussed, these physical errors can include, but are not limited to, scratches on a DVD or CD disc due to user mishandling, or physical errors on tape or flash media.

The process continues to step 406, which illustrates processor 202 determining whether the number of detected errors on the removable medium exceeds a predetermined threshold. This predetermined threshold of errors may be varied by the manufacturer of media device 102 via system firmware stored in memory 206, set via user-defined settings, or any other method. If processor 202 determines that the number of detected errors on the removable medium does not exceed a predetermined threshold, the process proceeds to step 408, which depicts processor 202 processing the data stored on the removable medium. The process continues to step 410, which illustrates a determination made as to whether processor 202 has completed processing the data stored on the removable medium. If processor 202 has not completed processing the data stored on the removable medium, the process returns to step 408. However, if processor 202 has completed processing the data stored on the removable medium, the process proceeds to step 412, which illustrates the process ending.

Returning to step 406, if processor 202 determines that the number of detected errors on the removable medium exceeds a predetermined threshold, the process proceeds to step 414, which illustrates media device 102 querying server 106 via communication module 204 and network adapter 208 for correction data.

The process continues to step 416, which depicts correction data module 318 of server 106 tailoring the correction data to be sent to requesting media device 102 by considering a variety of factors including, but not limited to: the connection speed established between server 106 and media device 102, the number and severity of errors found on the removable medium, and user settings 214 etc, as previously discussed. As illustrated by step 418, processor 302 of server 106 prepares the correction data to be sent to media device 102 via the factors discussed in conjunction with step 416. If correction data module 318 of server 106 determines that checksum data should be sent, the process proceeds to step 420, which illustrates correction data streamed with data stored on removable medium for on-the-fly corrections during processing. The process then ends, as illustrated by step 412. Returning to step 418, if server 106 determines that replacement correction data should be sent to media device 102, the process proceeds to step 422, which illustrates correction data being merged with original data stored on removable medium and stored in memory 206.

The process then proceeds to step 424, which illustrates processor 202 determining whether the flawed areas of the removable medium have been reached during processing of the data. If processor 202 determines that the flawed areas of the removable medium have been reached during processing, the process proceeds to step 426, which illustrates processor 202 processing the merged data stored in memory 206. The process then ends, as illustrated by step 412. However, if processor 202 determines that the flawed areas of the removable medium have not been reached during processing, the process continues to step 428, which depicts processor 202 continue processing the data stored on the removable medium.

The process then continues to step 430, which illustrates processor 202 determining whether the processing of the data has ended. If the data processing has not ended, the process returns to step 428. However, if processor 202 has determined that the process has ended, the process terminates at step 412, which depicts the process ending.

As disclosed, present invention includes a system and method of utilizing a network to correct flawed media data. The media device includes a processor, a memory, a network adapter, a removable media interface, and error-correction module, and a communication module. The network device enables the media device to connect to the network and server. The removable media interface enables a user to couple a removable medium to the media device. After a user inserts a removable medium into the removable media interface, the processor and error-correction module examines the removable medium for physical errors. If the number of detected errors exceeds a predetermined threshold, the media device, via the network adapter and the communication module, queries a server for correction data. This correction data may be utilized by the media device to enable successful processing of the data stored on the removable medium.

In a preferred embodiment of the present invention, a media device is implemented as a DVD/PVR machine (i.e., a device that incorporates a DVD drive and a disk component for replaying video) that is coupled to a server utilizing a variety of methods including, but not limited to a telephone modem connection, an Ethernet connection, or a cable TV connection. When a DVD (e.g., or any other type of removable medium) is placed into the media device, the media device scans the removable medium for errors (e.g., reads checksums for chapters of DVD).

Then, the media device scans the actual data fields for the chapters and checks the checksums of the physical platter of the DVD versus that of the listed checksums. A calculation is performed to determine the degradation percentage (i.e., how much of a chapter is scratched or will give a poor quality rendering of the data stored on the removable medium). The scanning procedure may be tailored by altering a collection of user preferences. If the quality of a chapter on the DVD is determined to be below a certain predetermined threshold, the media device notifies the user that corrective data is required for an accurate rendering of the data stored on the removable medium (e.g., clear quality picture in the case of a DVD movie). The media device may also notify the user of the amount of time required before the rendering of the data from the removable medium will begin, if the detected errors occur in areas of the removable medium that will be accessed at a later time. Corrective data for the detected errors can be downloaded in the background during playback of the earlier accessed areas of the removable medium.

Those with skill in the art will appreciate that correction data utilized in a preferred embodiment of the present invention include, but are not limited to, corrective data implemented as mathematical values utilized to correct erroneous bits and corrective data that is merged with original erroneous data and saved to memory. When the DVD player portion of the media player reaches erroneous areas on the DVD, the corrected/merged data can be played from directly from memory. Corrective data may be stored in files on a remote server and relayed upon request.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet, the Internet, wireless networks, and like network systems. It should be understood, therefore, in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A media device comprising:
   a processor;
   a data bus coupled to said processor;
   a memory coupled to said data bus;
   a network adapter, coupled to said data bus, wherein said network adapter couples said processor to a distributed network including at least one server;
   a removable media interface for accepting a removable medium, said removable media interface coupled to said processor; and
   a computer-usable storage medium embodying computer program code, said computer program code comprising instructions executable by said processor and configured for:
   detecting a number of errors on said removable medium;
   if said number of errors on said removable medium exceeds a predetermined threshold, querying said at least one server for correction data to be stored in said memory in accordance with at least one preference indicating a character of the correction data, wherein said at least one user preference indicates either high quality or low quality correction; and
   merging said correction data with data stored on said removable medium during processing of the data stored on the removable medium by the processor to enable successful processing of said data stored on said removable medium.

* * * * *